(12) United States Patent
Woodworth

(10) Patent No.: US 7,321,073 B2
(45) Date of Patent: Jan. 22, 2008

(54) PROCESS FOR TREATING LOW SOLIDS CONTENT HAZARDOUS MATERIALS

(76) Inventor: John Woodworth, 1754 N. Nicolas St., Appleton, WI (US) 54914

( * ) Notice: Subject to any disclaimer, the term of this patent is extended or adjusted under 35 U.S.C. 154(b) by 271 days.

(21) Appl. No.: 10/799,173

(22) Filed: Mar. 12, 2004

(65) Prior Publication Data

US 2004/0181113 A1    Sep. 16, 2004

(51) Int. Cl.
*A62D 3/34*    (2006.01)
*C02F 11/14*    (2006.01)

(52) U.S. Cl. .................. 588/316; 210/769; 588/406; 588/412

(58) Field of Classification Search ............ 423/316, 423/312, 406, 407, 412; 210/769
See application file for complete search history.

(56) References Cited

U.S. PATENT DOCUMENTS 5,103,578 A * 4/1992 Rickard .................... 34/92
5,232,604 A * 8/1993 Swallow et al. ............ 210/759

OTHER PUBLICATIONS

Duffy et al., (2000), Environ. Sci. Technol., 34, 3199-3204, "Wet Peroxide Oxidation of Sediments Contaminated with PCBs".*

* cited by examiner

*Primary Examiner*—Stuart L. Hendrickson
*Assistant Examiner*—James Fiorito
(74) *Attorney, Agent, or Firm*—Andrus, Sceales, Starke & Sawall, LLP

(57) ABSTRACT

A high temperature and high pressure process utilizes dehaloganation, oxidation, or similar reactions to chemically alter hazardous organic chemicals to render them non-hazardous. The method is particularly adaptable to the treatment of sediments in bodies of water and includes process steps to destroy contaminants such as PCBs in one product stream and to capture heavy metals for disposal in a smaller second product stream.

6 Claims, 1 Drawing Sheet

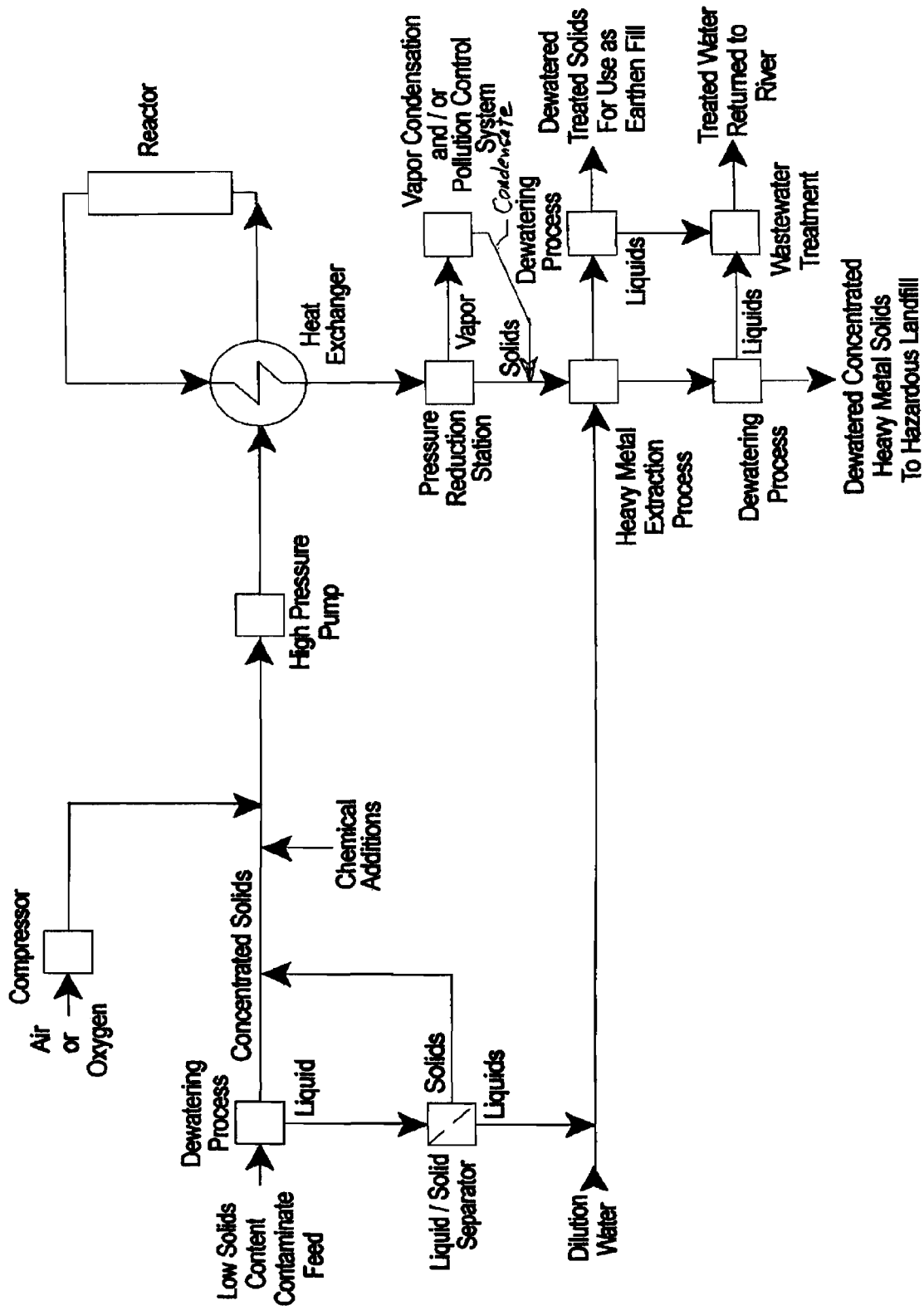

PROCESS FOR TREATING LOW SOLIDS CONTENT HAZARDOUS MATERIALS

BACKGROUND AND GENERAL PROCESS DESCRIPTION

My invention comprises a process to treat contaminated materials, like those found in river sediments, that contain various hazardous contaminates such as coal tar, polychlorinated biphenyls (PCBs), dioxins, furans, pesticides [examples: dichlodiphenytrichloroethane (DDT)], and heavy metals (examples: mercury and lead), and characterized by a high-liquid—low-solids or aqueous content. The proposed continuous or semi-continuous process will destroy, chemically alter, denature and concentrate these typical contaminants into two product (solids) streams. One larger solids stream will have contaminate levels below applicable federal, state, and local guidelines and characterized as non-hazardous, for use as an earthen fill or allow disposal by land spreading. The second, much smaller solids stream, will contain the concentrated heavy metal contaminates (identified as those with high specific gravities). It is anticipated that this solids stream will be transported to a hazardous landfill for disposal.

This process utilizes high pressure and temperature to drive chemical reactions to remove chlorine molecules (a process called dehaloganation), to break some or all of the benzene rings found in these compounds, to partially or totally oxidize carbon compounds, and to otherwise denature, destroy, or chemically alter hazardous organic compounds into non-hazardous states.

The high temperature and pressure process that will be used is similar to that sold by Zimpro Corporation, Rothschild, Wis. (and others) under the name of wet-air oxidation. This standard process allows typical chemical reactions (like oxidation) to take place in an aqueous environment. The wet air oxidation process has been in use for many years. This vendor has attempted to destroy similar contaminate materials (e.g. from the Mississippi River) in pilot lab testing without success using their standard wet air oxidation process. It is believed that the standard wet air oxidation process has been used successfully to destroy pesticides (like DDT).

An alternative process called catalytic wet air oxidation, as promoted by several companies, may be used as part of this treatment process. Testing this process would have to identify a catalyst to help achieve the reactions to break down PCBs. A method for a fixed bed within the reactor or feed of the selected catalyst.

The US Environmental Agency (EPA) has approved chemical dehalogenation as an acceptable process to destroy PCBs in dry soil. The BCD Group, Inc. has patents on their "base catalyzed dehalogenation" (BCD) version of this process. Their two(2)-step process first volatilizes organic compounds from dry soil and then captures these organics from the vapor stream. This first process step is carried out at or near atmospheric pressure at temperatures of about 300° C. (575° F.). In the second process step, the condensed organics are treated in a stirred reactor containing a base, a hydrogen donor compound, and a catalyst like carbon, graphite, or iron. This process requires dry contaminate material to be economically viable per the available literature.

Phase Remediation, Incorporated—a corporation residing in Dartmouth, Nova Scotia, has developed a gravimetric type unit, called the KMS Separator, to separate/concentrate heavy metal materials from "soils and ores primarily" per their literature. This equipment and related process would be modified to concentrate the heavy metal contaminates from my process into a concentrated stream containing only a small percentage of the solids that originally enter the system.

My process incorporates these three processes with other auxiliary equipment and ancillary processes such as dewatering, pollution control, oxygen generation, hydraulic dredging, etc. to treat contaminated sediment like that found in the Fox, Wisconsin and Hudson, New York Rivers (among others), and Duluth/Superior, Wisconsin and Manistique, Michigan Harbors, (among others).

The basis for my process is a continuous/semi-continuous process that uses high pressure and temperature operating conditions to force chemical dehalogenation, oxidation, and other reaction(s) to destroy, denature, or otherwise chemically alter hazardous organic chemicals such as PCBs, dioxins, furans, pesticides, coal tar, etc. in aqueous solutions/slurries/suspensions, into non-hazardous states. Inorganic materials, such as heavy metals characterized by high specific gravities, will be separated/concentrated in subsequent processing steps to remove this type of hazardous material from the process stream.

The process is envisioned to be portable, self-contained, comprehensive, and compact enough to be housed on one or more barges located on the river or other water impoundment containing the contaminated sludge. The process will be connected to a hydraulic dredge that continuously removes the contaminated sludge from the bottom of the body of water for supply to the treatment system (process). This proposed process will offer the following advantages when compared to some or all of the available alternate technologies of hazardous landfilling all removed contaminated sediment/sludge, high temperature incineration, vitrification, off-site treatment, and alternate processes approved and/or tested by the EPA:

Production of a dewatered, non-hazardous material with an economic value as an earthen fill.

Lower transportation costs for sludge removed from the contaminated site since, a majority of the removed material will be classified as non-hazardous and can be transported to any acceptable location that can utilize an earthen fill.

Greatly reduced land acquisition costs adjacent to the river or water impoundment, compared to alternatives since all that is required is a compact land-based site to handle transport of the two solid waste streams, and the supply of consumables and operators to the process. Alternate processes require land-based wastewater treatment plants, sludge dewatering facilities, incinerators, or other sites.

Reduced size and complexity for the hazardous landfill that is required. The volume of material needing hazardous landfilling is <3% of the original solids volume. Heavy metals are not soluble in water, so migration of these contaminants is less likely from a landfill site. (With the major reduction in the volume of material requiring landfilling, there is some possibility that the existing landfills from the area paper mills could be used for this material. This scenario would mean no new landfills would be required.)

The wet air oxidation process drives chemical reactions without the need to first evaporate the water, greatly reducing the heating load for this process.

The standard wet air oxidation process utilizes heat exchanger(s) to efficiently recover a portion of the energy used or generated by oxidation in the process.

Because of the lower operating temperature and enclosed basis for the process, heavy metals will be contained rather than volatilized and potentially lost to the surrounding environment.

The wet air oxidation process is expected to reduce the chemical and biological oxygen demand (COD and BOD) levels in the wastewater streams resulting in simpler, less costly requirements for cleanup before the wastewater is returned to the body of water.

By working with a fixed flowrate, comprehensive process, all equipment can be selected to operate at an efficient level.

BRIEF DESCRIPTION OF THE DRAWING

The sole drawing figure is a schematic depiction of the process of the present invention.

DETAILED PROCESS DESCRIPTION

Fox River (Wisconsin) sediment has as a solids content of about 25% by weight. For transport, a cutterhead dredge agitates the sediment into the suction of a hose. Water is also drawn in, diluting the solids content to an estimated 5% by weight. This dilute mixture is pumped through a floating pipeline to the treatment process, housed on a pair of barges located in the river adjacent to the dredging site. Barges will be sized to allow transit through the Fox River Locks System. One barge will house high-pressure equipment and the other will house low pressure or ancillary units so that some form of high-pressure expansion connection is not required for process steps that move between the barges. This is necessary because wave action will cause the barges to move independently under normal conditions, so some form of expansion joint or flexible hose connection will be required at all such interconnections.

The first process step will be to dewater the sediment to achieve an increased solids content. Either centrifugation, filtration, or pressing will be used to achieve a thickened sediment with an estimated 50% solids content. Since PCBs and the other contaminants in the sediment are not soluble in water, it anticipated that they will preferentially concentrate in the solids stream and not in the filtrate or liquid stream from this thickening step. The filtrate (or liquid) will be further filtered in a polishing type filter to remove any remaining suspended solids for transfer and addition into the thickened solids for treatment. This filtration step will insure the capture and transfer of all contaminants into the treatment stream. The filtrate will be saved for use in further dilution steps later in the process. Dewatering the sediment to 50% by weight will in effect reduce the amount of sludge that must be treated by half, while still leaving it pumpable.

The thickened sediment is added into a modified wet air oxidation (WAO) process for thermal treatment under high temperature and pressure operating conditions. Using high temperature, e.g. 800° F. to 2000° F., and pressure, e.g. 800 to 2500 psi, will allow typical chemical reactions to take place in the presence of water that would not normally react or take place and is a typical advantage with the wet air oxidation process. It is possible that catalytic wet air oxidation could also be used in place of the standard wet air oxidation process. Tests will determine which is the better alternative for this application. There are three (3) modifications to the standard WAO process that I am proposing, that to the best of my knowledge have not been used before. These are (1) the addition of air or oxygen into the suction of the typical high-pressure hydraulic pump, (2) the addition of chemicals into the suction of the high-pressure hydraulic pump to promote and achieve certain desirable chemical reactions under the process operating conditions, and (3) the pressure reduction station required as part of the web-air oxidation process will be of a design that promotes the entrainment of the treated solids in a fine particulate state in a water stream to enhance the subsequent gravimetric separation process to remove the heavy metal contaminate fraction. The design of this proposed pressure reduction station differs considerably from the design of a typical station where no attempt is made to entrain or dilute the solids stream. Since sediment averages about 5% by weight organic materials, the required addition rate of air or oxygen into the WAO process will not be a large fraction of the flow. While air or oxygen is compressible, the loss of pumping efficiency in the positive displacement high-pressure hydraulic pump will not be very great. In the typical WAO process, a high-pressure compressor is used to pressurize the air or oxygen up to the operating pressure for combining with the pressurized solids stream downstream from the high-pressure hydraulic pump. It is anticipated that the high-pressure compressor can be eliminated from the process by using the high-pressure hydraulic pump to pressurize the solids/air or oxygen mixture. A low-pressure compressor will be needed to generate oxygen in an $O_2$ Generator or to move air or oxygen into the process.

In a typical WAO process, only air or oxygen is added to promote the standard oxidation reaction to combine carbon, from organic compounds, with oxygen to form carbon dioxide and water. I propose to add two classes of chemicals to the WAO process. The first type is an organic compound, like propane, that will be readily oxidizable under the operating conditions to add heat to the process because of the exothermic oxidation reaction. The intent of this addition will be to efficiently generate an autogenous process that can operate without external heating sources under normal operating conditions. Propane is mentioned because it is readily available, storable, and can be used for other process uses like to power generators for electricity production. The use of other organic compounds like gasoline, fuel oil, and others will be tested for suitability in this application. The addition rate for the chemical additive will be regulated by monitoring the process temperature in order to maintain the desired operating conditions. The second class of chemicals will be added to promote desirable reactions that help breakdown PCBs, dioxins, and furans in the sediment. It is intended that these chemicals will help remove the chlorine molecules from these contaminant compounds to make them less stable and toxic, and to break the benzene rings that remain. These chemicals will be selected based on testing, but could include sodium carbonate, sodium hydroxide, hydrogen peroxide, iron, aliphatic hydrocarbons, and/or others.

The pressurized solids mixture will be transported through a heat exchanger and on to the reactor. The reactor allows enough residence time for the desired chemical reactions to take place under the high pressure and temperature operating conditions. From the reactor the solids will be transported back to the other side of the heat exchanger to give up heat to the incoming stream. It is expected that a heat exchange rate of at least 50% will be possible, making this process very thermally efficient compared to other methods of destroying PCBs and the other organic contaminant compounds.

From the heat exchanger, the solids will travel to the pressure reduction station, which is used to reduce the stream pressure from between 800 to 2500 pounds per square inch down to atmospheric on a continuous basis in one or more stages. The final pressure reduction is done across a small variable orifice, which will promote atomization of the solids into small particles with some vaporization/volatilization expected of water and other volatile constituents. It is expected that the small, atomized solids (and any nonvaporized liquid) particles can be captured in a continuous water stream to keep them from agglomerating and for transport to the downstream heavy metal separating processing steps (if required due to the presence of heavy metals in the sediment). Any vapor off the pressure reduction station will be condensed and the condensate returned to the solids stream for further processing. This will allow the capture of any volatilized heavy metals or other solids for return to the downstream process for removal. Any remaining noncondensibles will be further treated to reduce odors in some apparatus like a scrubber, potentially with chemical treatment with reagents such as potassium permanganate.

The solids stream will be diluted with the water removed in the first dewatering step (plus additional river water, if required) and run through several centrifugal separators to remove and concentrate the heavy metals from the solids stream gravimetrically based on their heavier specific gravities. Having the small solid particle size from the pressure reduction station should promote and enhance this separation action. These separation steps will produce a treated solids stream composed of an anticipated 97% of the total solids that meets all required pollution level standards for use as an earthen fill material. The remaining <3% solids will contain the concentrated heavy metal contaminants from the original sediment. Both solids streams will be dewatered separately by centrifugation, filtration, or pressing to achieve an anticipated 50% solids content. The separate solids stream will be pumped/discharged into an independent two(2)-compartment barge for transport off the river and subsequent disposal. Water separated from the treated solids dewatering steps will be processed to required contaminant levels to allow its return to the river or other body of water. Suspended solids in this water stream will be removed by filtration. These removed solids will be added to one of the product solid streams based on its contaminate chemical markup. Further, the water will contain ammonia, as generated by the anaerobic decomposition process of organic material originally found in the sediment at the bottom of the river. The water used to transport the sediment to the treatment process from the hydraulic dredge and removed in the first process dewatering step is the source of this contaminate. To remove or otherwise reduce the concentration of ammonia in the water to allowable disposal levels, the water stream will be pressurized and sprayed under pressure through nozzles to form small aerosol droplets to allow the ammonia to evaporate before the droplets fall into the river for disposal from the process. As an alternate to these sprayers, the water stream could be run through a standard Counter-Current Stripper using air to remove the ammonia to acceptable concentration levels before disposal back into the river.

I claim:

1. A method for treating low solids content sediment from a body of water, said sediment including halogenated organic compound and heavy metal contaminants, the method comprising the steps of:

(1) dewatering the sediment to obtain a stream having a concentrated solids content of about 50% by weight comprised of inorganic and organic fractions;

(2) adding air or oxygen, a supplemental fuel, and a reactant to the concentrated solids stream, said reactant selected from the group consisting of sodium carbonate, sodium hydroxide, hydrogen peroxide, iron, aliphatic hydrocarbons, and mixtures thereof;

(3) pressurizing the concentrated solids stream to a pressure in the range of about 800 to 2500 psi;

(4) preheating the pressurized stream by passing the stream from step (6) through a heat exchanger;

(5) conveying the preheated stream into a reactor with the fuel addition sufficient to maintain a self-sustaining reaction temperature to dehalogenate and decompose or denature the contaminant compounds;

(6) returning the dehalogenated and decomposed or denatured stream to the heat exchanger to provide heat for the preheating step; and, (7) reducing the pressure of the stream for further processing by directing the stream through a small variable orifice to generate a liquid and atomized solids fraction and a volatilized fraction;

(8) condensing the volatilized fraction;

(9) combining the condensate with the liquid and atomized solids fraction to provide a second concentrated solids stream;

(10) adding the water fraction from the dewatering step to the second concentrated solids stream to provide a dilute solids stream; and,

(11) gravimetrically separating the solids from the dilute solids stream in stages to separate the heavy metals from the remaining dilute solids stream to provide a heavy metals solid stream and a remaining solids stream.

2. The method as set forth in claim 1 including the step of operating the reactor at a temperature in the range of 800° F. to 2000° F.

3. The method as set forth in claim 1 including, prior to said pressurizing step, the step of adding to the concentrated solids stream a catalyst selected from the group consisting of carbon, graphite, and iron.

4. The method as set forth in claim 1 including the steps of:

(1) dewatering the heavy metals solids stream to provide a concentrated heavy metals fraction and a liquid fraction; and, (2) dewatering the remaining solids stream to provide a treated solids fraction and a second liquid fraction.

5. The method as set forth in claim 1 including the steps of:

(1) providing a first barge for process equipment utilized in performing steps (1) and (2);

(2) providing a second barge for process equipment utilized in performing steps (3) - (7); and, (3) providing one or more low pressure process flow connections between said barges.

6. A method for treating low solids content sediment from a body of water, said sediment including halogenated organic compound contaminants, the method comprising the steps of:

(1) dewatering the sediment to obtain a stream having a concentrated solids content of about 50% by weight comprised of inorganic and organic fractions;

(2) adding air or oxygen, a supplemental fuel, and a reactant to the concentrated solids stream, said reactant selected from the group consisting of sodium carbonate, sodium hydroxide, hydrogen peroxide, iron, aliphatic hydrocarbons, and mixtures thereof;

(3) pressurizing the concentrated solids stream to a pressure in the range of about 800 to 2500 psi;

(4) preheating the pressurized stream by passing the stream from step (6) through a heat exchanger;

(5) conveying the preheated stream into a reactor with the fuel addition sufficient to maintain a self-sustaining reaction temperature to dehalogenate and decompose or denature the contaminant compounds;

(6) returning the dehalogenated and decomposed or denatured stream to the heat exchanger to provide heat for the preheating step;

(7) reducing the pressure of the stream for further processing; and, (8) the pressurizing step is performed with a high pressure hydraulic pump, and the step of adding air or oxygen comprises adding the air or oxygen directly into a suction of the pump.

* * * * *